United States Patent [19]

Richter et al.

[11] Patent Number: 5,786,121

[45] Date of Patent: Jul. 28, 1998

[54] PROCESS FOR PRODUCING ELECTROPHOTOGRAPHICALLY ACTIVE TITANYLPHTHALOCYANINE MODIFICATIONS

[75] Inventors: Andreas M. Richter, Halle; Roland Ackermann, Bitterfeld; Manfred Lutz, Warstein; Hans-Josef Humpert, Anröchte, all of Germany

[73] Assignee: Syntec Gesellschaft für Chemie und Technologie der Informationsaufzeichnung mbH, Wolfen, Germany

[21] Appl. No.: 875,616

[22] PCT Filed: Feb. 2, 1996

[86] PCT No.: PCT/DE96/00207

§ 371 Date: Jul. 15, 1997

§ 102(e) Date: Jul. 15, 1997

[87] PCT Pub. No.: WO96/24638

PCT Pub. Date: Aug. 15, 1996

[30] Foreign Application Priority Data

Feb. 8, 1995 [DE] Germany ............... 195 05 784.8

[51] Int. Cl.⁶ ............... C09B 47/04; G03G 5/06
[52] U.S. Cl. ............... 430/135; 540/140
[58] Field of Search ............... 430/135; 540/140

[56] References Cited

U.S. PATENT DOCUMENTS

| 3,825,422 | 7/1974 | Gruber et al. ............... 430/37 |
| 5,334,478 | 8/1994 | Desilets et al. ............... 430/135 |
| 5,432,278 | 7/1995 | Yamazaki et al. ............... 540/140 |

FOREIGN PATENT DOCUMENTS

| 460565 | 6/1991 | European Pat. Off. . |
| 508772 | 4/1992 | European Pat. Off. . |
| 516433 | 5/1992 | European Pat. Off. . |
| 1-172462 | 7/1989 | Japan ............... 540/140 |
| 3-71144 | 3/1991 | Japan ............... 430/135 |

OTHER PUBLICATIONS

Fujimaki et al., Journal of Imaging Technology, vol. 17, pp. 202–206, 1991.

Chemical Abstracts: 93:217,372.

*Primary Examiner*—Roland Martin
*Attorney, Agent, or Firm*—Collard & Roe, PLC.

[57] ABSTRACT

A process is for producing electrophotographically active titanylphthalocyanine. In the process, which has an improved space-time yield, titanylphthalocyanine is dissolved in pentafluoropropionic acid and a solvent of the group comprising halogenated alkanes/aromatic compounds or halogenated alkanes/aromatic compounds and sulphonic acids. The active form is precipitated by precipitation with water in the presence of a further polar organic solvent. A mixture of pentafluoropropionic acid and methylene chloride and a mixture of p-toluene sulphonic acid and methane sulphonic acid are particularly suitable as solvents. The precipitated product processes very good electrophotographic properties.

13 Claims, 3 Drawing Sheets

PROCESS FOR PRODUCING ELECTROPHOTOGRAPHICALLY ACTIVE TITANYLPHTHALOCYANINE MODIFICATIONS

The invention relates to a new process for producing titanylphthalocyanine modifications. These highly active forms can be used as picture-generating components in electrophotography.

The use of titanylphthalocyanine in electrophotography has been known for some considerable time (e.g. U.S. Pat. No. 3,825,422). When dealing with this compound it has become evident that the electrophotographic activity depends on its morphology. The different modifications were given different designations by individual manufacturers. [Form I (or β or A); form II (or α_or B); form III (or C or m); form IV (or y or "new type"); form X; form Z1 and form Z2]. It is significant that as a result of suitable treatment, the electrophotographically less active forms (e.g. the α- or β-form) can be transformed into electrophotographically more active forms (preferably into form IV). As is well known, this can already happen in acidpasting which has been known for a long time, in which a phthalocyanine is dissolved in concentrated sulphuric acid and precipitated again by adding water. In this it is difficult to obtain the different modifications in pure form. For example, a process for producing form IV has been described in DE 3823363.

It seems obvious that for producing titanylphthalocyanine in general, the path from diamino-isoindolyl and $Ti(OR)_4$ ($R=C_1-C_6$) seems to be more advantageous than from phthalonitrile and titanylchloride. EP-A-460565 as well as applications additional to it describe the production of different polymorphous titanylphthalocyanine forms in detail. In this, the production of form IV is from crude titanylphthalocyanine with trifluoroacetic acid/methylene chloride as a solvent and subsequent precipitation of the titanylphthalocyanine by way of a solvent system, in particular an alcohol (MeOH) and water. Subsequently, the precipitate is washed and dried. The additional patent (EP-A-508772) published later, discloses the production of form I from 1,3-diamino-isoindolyl and titanium tetrabutoxide; the dissolution of this in trifluoroacetic acid in order to obtain form X; and the transformation of form X into form IV by treatment with halobenzenes, especially chlorobenzene.

According to Fujimaki, Y. et al. J. Imag. Techn. 17 (1991) 202,significant characteristics of form IV are a dark waste of 13 V/sec (charging potential –600 V), a half-fall energy E/2 of 0.75 erg/cm² (at 800 mm) and an afterpotential of 70 V at 10 erg/cm². Furthermore, significant characteristics of form IV are peaks in the X-ray diffraction diagram at 2θ at 9.4° and 27.3°.

It is the objective of the invention to offer a new process for producing electrophotographically active titanylphthalocyanine.

The process for producing electrophotographically active titanylphthalocyanine according to the invention consists of crude, electrophotographically inactive titanylphthalocyanine being dissolved in a mixture of pentafluoropropionic acid and a solvent from the group comprising halogenated alkanes, halogenated aromatics or halogenated alkanes and/ or halogenated aromatics and sulphonic acids or sulphonic acid mixtures; and by precipitating the titanylphthalocyanine with water, if necessary in the presence of a further polar organic solvent.

The electrophotographically active titanylphthalocyanine is obviously of type IV, because it shows its characteristics in the X-ray diffraction diagram, i.e. in the X-ray diffraction diagram it displays characteristic diffraction angles at 9.4° and 27.3°.

The halogenated alkane used in the process according to the invention is a polychloralkane or polybromalkane, preferably selected from among methylene chloride, dichloroethane, trichloromethane, trichloroethane, in particular methylene chloride. Chlorobenzene is an example of a halogenated aromatic used.

The sulphonic acid also used as a solvent, in combination with a halogenated alkane and/or halogenated aromatics, is an aliphatic or an aromatic sulphonic acid, in particular a fluorinated sulphonic acid. Apart from monosulphonic acids, it is possible to use disulphonic acids, carboxysulphonic acids or sulphophosphonic acids. Particularly advantageous sulphonic acids are selected from among p-toluene sulphonic acid, methanesulphonic acid, trifluoromethanesulphonic acid, preferably p-toluene sulphonic acid or methanesulphonic acid, or a mixture of the two. But it is also possible to use other sulphonic acid mixtures.

The ratio of penta fluoropropionic acid to halogenated alkane/-aromatics to sulphonic acid or sulphonic acid mixture ranges from 1:2 to 6:0.1 to 4; preferably in the range of 1:2.5 to 4.5:1 to 2.5.

The use of titanylphthalocyanine made from diaminoisoindolyl is preferred as an initial product.

Precipitation of the titanylphthalocyanine dissolved in the above-mentioned solvent (mixture) can take place in water, but is preferably in a mixture of methanol:water, whereby the content of methanol is in the range of 40% to 60%, in particular in the range of 45 to 55%, preferably the ratio is 1:1.

When compared to the hitherto known activation process with trifluoroacetic acid and methylene chloride, the present process displays significantly better space-time-yield, in particular, if pentafluorpropionic acid, methylene chloride and a mixture of methanesulphonic acid and toluenesulphonic acid are used. Apart from this, titanylphthalocyanine of lesser purity can be used as a base material, which results in economic advantages.

Surprisingly, in particular when compared with the description of EP-A-460565,it has been shown that 1) dissolution in another solvent system is possible, and
2) precipitation with the solvent system methanol/-water in the indicated mixing ratio of 60:40 to 40:60 does not lead to type X (refer to Table 2 and in particular Table 3 in EP-A-460565), but to type IV.

When precipitating with water only, a high percentage of type IV is obtained.

Below, the invention is described in more detail by means of examples.

EXAMPLE 1

10 g titanylphthalocyanine was dissolved in a mixture of 60 ml pentafluoropropionic acid and 240 ml methylene chloride. The dark-green solution was poured into 1.5 l of a well-stirred mixture of methanol and water (1:1). Upon completion of precipitation, the mixture was filtered over a glass frit. Subsequent washing with water (four times with 1 l ) followed by washing with methylene chloride (0.5 l ) and acetone (0.5 l ) and vacuum drying yielded 9.9 g of deep-blue titanylphthalocyanine with the electrophotographic characteristics listed in Table 1.

EXAMPLE 2

10 g titanylphthalocyanine was dissolved in a mixture of 15 ml pentafluoropropionic acid and 60 ml methylene chloride and 75 ml of a 30% solution of p-toluene sulphonic acid in chlorobenzene. The dark-green solution was poured into 2 l of a well-stirred mixture of methanol and water (1:1). Upon completion of precipitation, the mixture was filtered over a glass frit. Subsequent washing as in example 1 yielded deep-blue titanylphthalocyanine with the electrophotographic characteristics listed in Table 1.

EXAMPLE 3

10 g titanylphthalocyanine was dissolved in a mixture of 15 ml pentafluoropropionic acid, 60 ml methylene chloride and 20 ml of methanesulphonic acid. The dark-green solution was poured into 1.5 l of a well-stirred mixture of methanol and water (1:1). Upon completion of precipitation, the mixture was filtered over a glass frit. subsequent washing as in example 1 and vacuum drying yielded 4.9 g of deep-blue titanylphthalocyanine with the electrophotographic characteristics listed in Table 1.

EXAMPLE 4

The procedure was the same as in example 3, except that precipitation was carried out with a mixture of methanol:water of 60:40. After filtration, washing and drying, deep-blue titanylphthalocyanine with the desired electrophotographic characteristics as in example 3 was obtained.

EXAMPLE 5

The procedure was the same as in example 3, except that instead of methanesulphonic acid a mixture of trifluoromethanesulphonic acid and toluenesulphonic acid at a ratio of 1:2 and at a quantity of 15 ml was used. After filtration, washing and drying, deep-blue titanylphthalocyanine with the desired electrophotographic characteristics as in example 3 was obtained.

The electrophotographic characteristics of the titanylphthalocyanines produced according to the different processes were determined in a double layer system. In this, an aluminised polyester backing was coated with a dispersion of the titanylphthalocyanine in polycarbonate/methylenechloride. The CGL generated in this way after drying was coated with a solution of N,N'-diphenyl-N,N'-di-(m-tolyl)-benzidine in polycarbonate/-methylenechloride and measured after drying.

TABLE 1

| Product according to example | $U_D$[V/3 sec] | $U_O$[V] | $E_{0.5}$[µJ/cm$^{-2}$] | $U_R$[V] |
|---|---|---|---|---|
| 1 | 32 | 930 | 0.15 | <10 |
| 2 | 25 | 920 | 0.13 | <10 |
| 3 | 30 | 870 | 0.12 | <10 | where $U_D$=dark fall-off
$U_O$=recharge potential
$E_{0.5}$=quantity of light necessary to reduce $U_O$ to 50%
$U_R$=afterpotential with 6µJcm$^{-2}$ white light

BRIEF DESCRIPTION OF THE DRAWINGS

The products produced according to example 1 or 2 or 3 respectively, display the X-ray diffraction spectrums according to FIG. 1 or FIG. 2 or FIG. 3 respectively.

Figure 1:
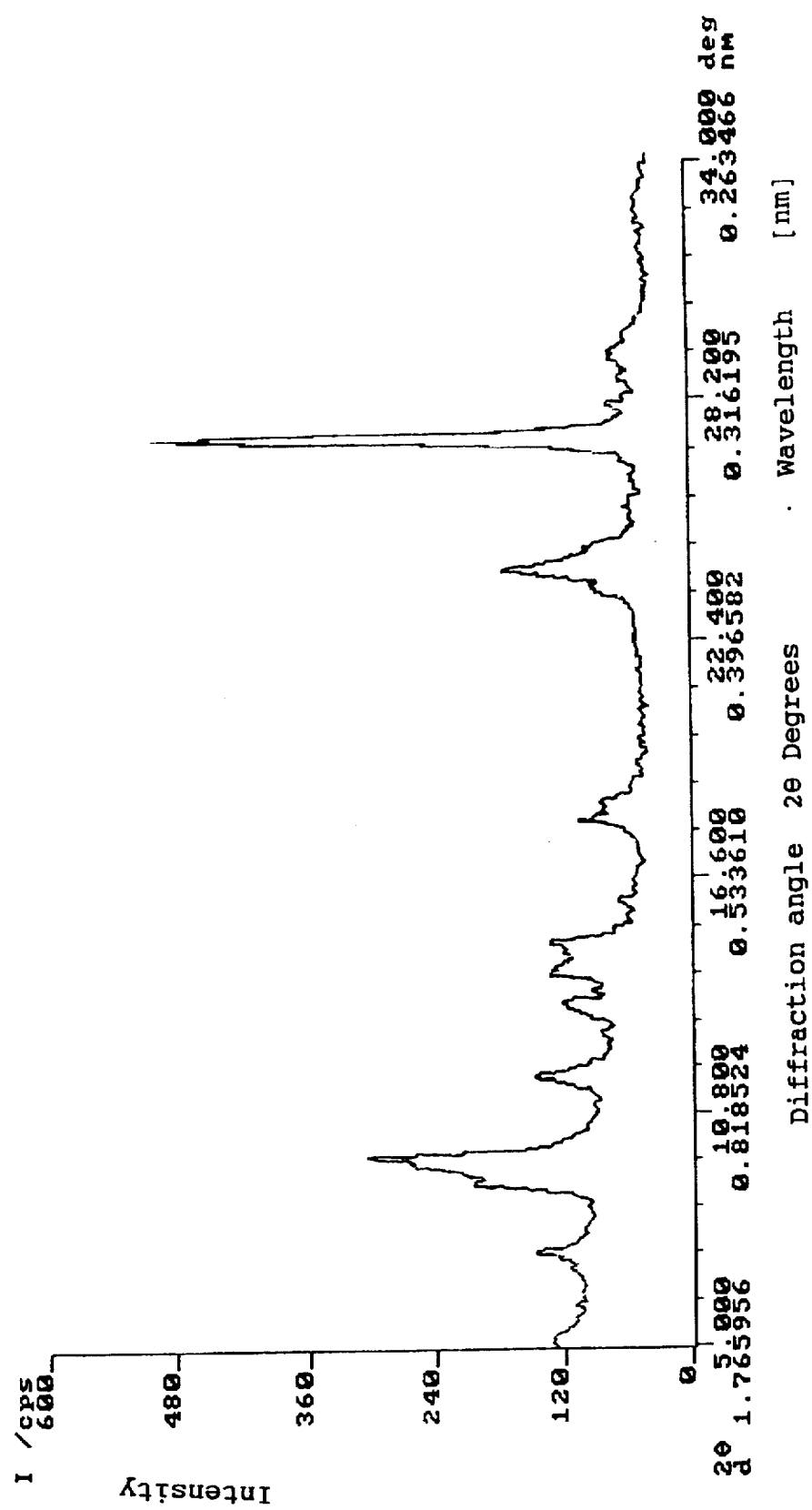
Figure 2:
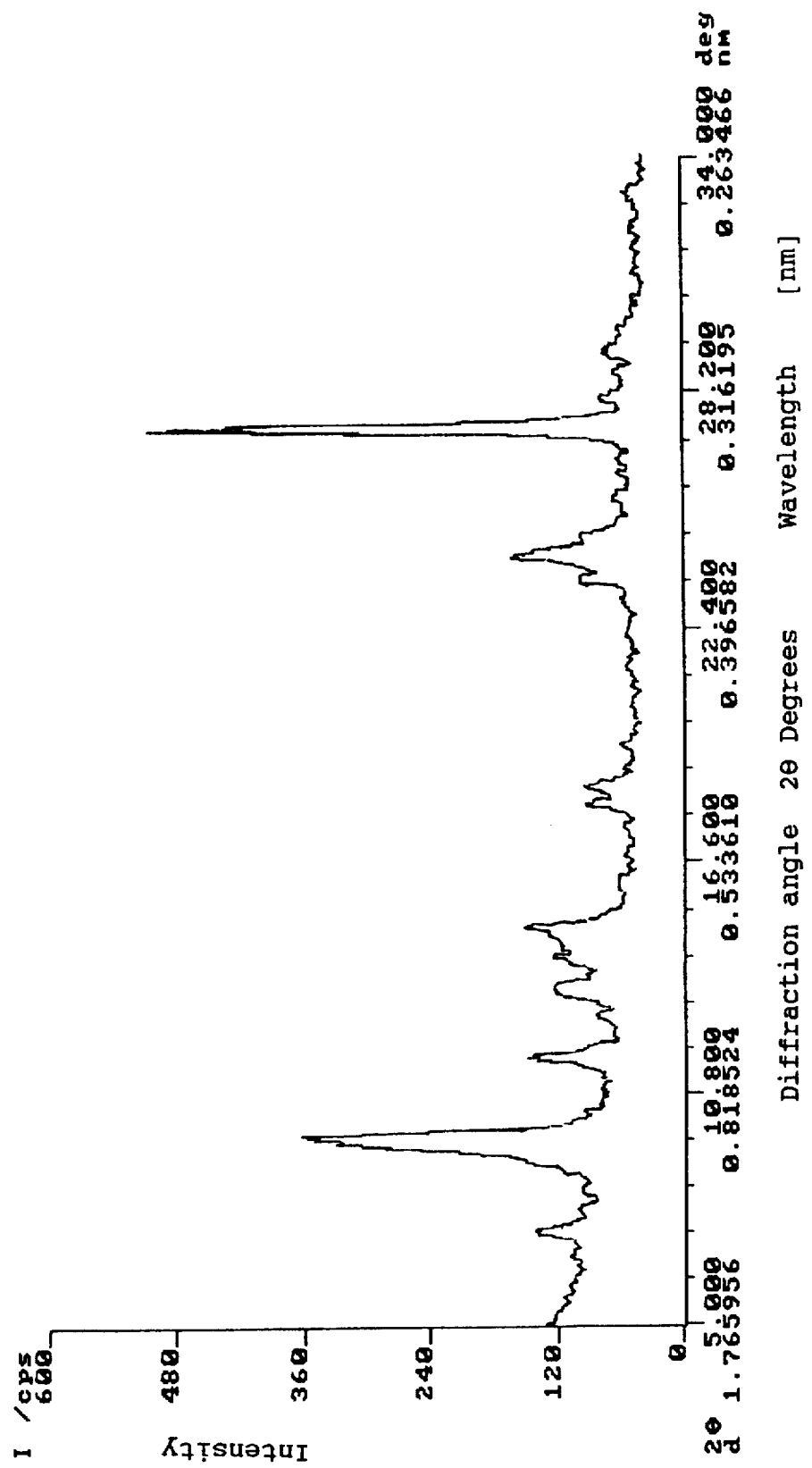
Figure 3:
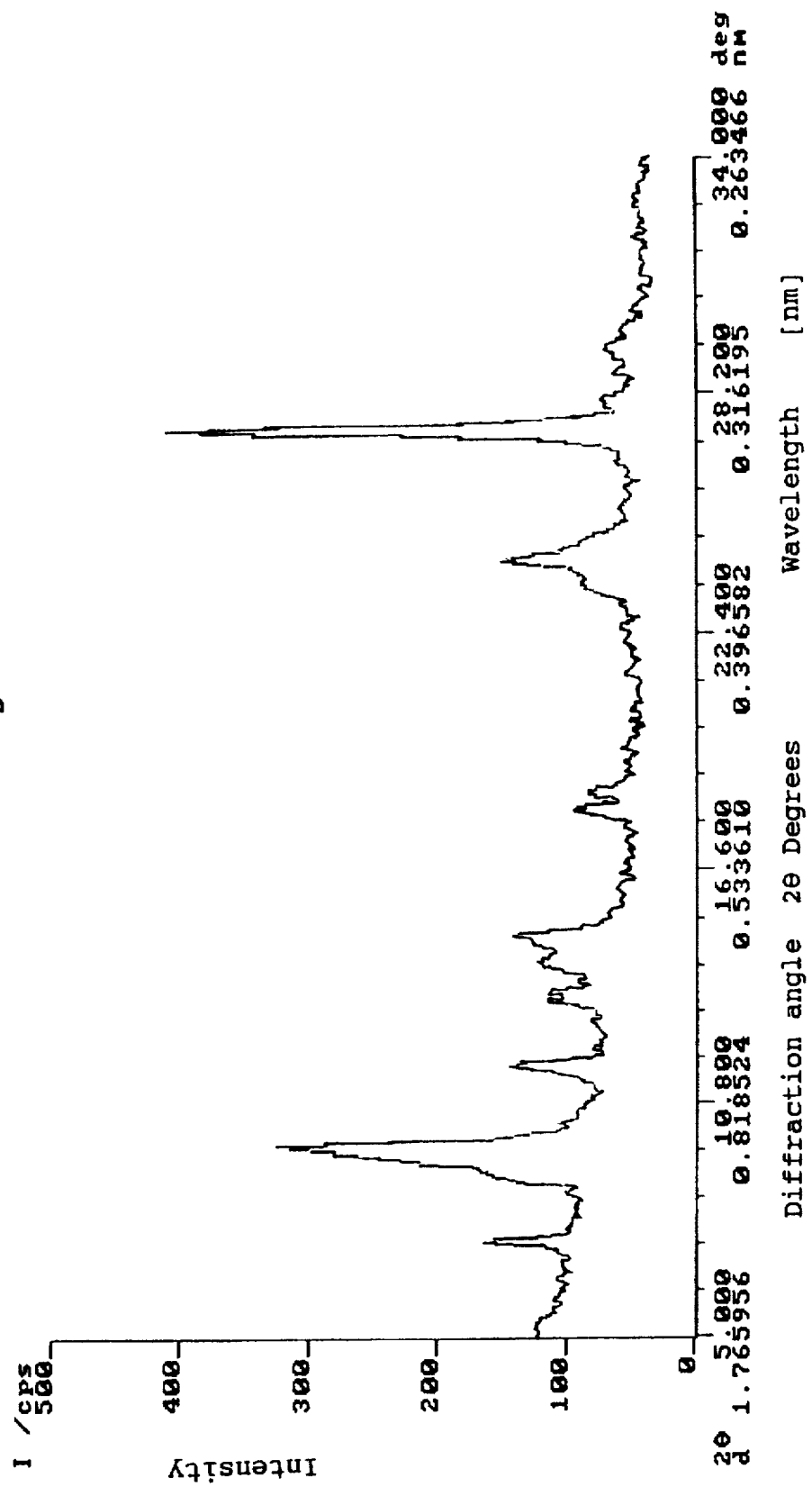

We claim:

1. A process for producing electrophotographically active titanylphthalocyanine, comprising dissolving titanylphthalocyanine in a mixture of pentafluoropropionic acid and a solvent selected from the group consisting of
(1) a halogenated alkane,
(2) a halogenated aromatic and
(3) a combination selected from the group consisting of
(a) a halogenated alkane and at least one sulphonic acid;
(b) a halogenated aromatic and at least one sulphonic acid; and
(c) a halogenated alkane and a halogenated aromatic and at least one sulphonic acid;

and precipitating the titanylphthalocyanine with water, if necessary in the presence of a further polar organic solvent.

2. A process according to claim 1, wherein the halogenated alkane is selected from the group consisting of methylene chloride, dichloroethane, trichloromethane and trichloroethane.

3. A process according to claim 1, wherein the sulphonic acid is an aliphatic sulphonic acid, selected from the group consisting of methanesulphonic acid, and trifluoromethanesulphonic acid.

4. A process according to claim 1, wherein the sulphonic acid is an aromatic sulphonic acid, selected from the group consisting of benzenesulphonic acid, p-toluenesulphonic acid, 1-napthalenesulphonic acid, and 2-napthalenesulphonic acid.

5. A process according to claim 1, wherein the at least one sulphonic acid is a mixture of at least 2 sulphonic acids.

6. A process according to claim 1, wherein said precipitating takes place in a mixture of polar organic solvent/water.

7. A process according to claim 6, wherein said precipitating takes place in a mixture of methanol/water in which the methanol ranges from 40 to 60% by vol.

8. A process according to claim 1, wherein the titanylphthalocyanine used is made from diimini-isoindolyl.

9. A process according to claim 2,
wherein the halogenated alkane is methylene chloride.

10. A process according to claim 4,
wherein the aromatic sulphonic acid is p-toluenesulphonic acid.

11. A process according to claim 5,
wherein said mixture comprises a mixture of p-toluenesulphonic acid and methanesulphonic acid.

12. A process according to claim 7,
wherein the precipitating takes place in a mixture of methanol/water in which the methanol ranges from 45% to 55% by vol.

13. A process according to claim 7,
wherein the precipitating takes place in a mixture of methanol/water at a volume ratio of 1:1.

* * * * *